United States Patent
Ha et al.

(10) Patent No.: US 8,238,937 B2
(45) Date of Patent: Aug. 7, 2012

(54) LOCATION SENSING SYSTEM AND METHOD FOR MOBILE COMMUNICATION SYSTEM

(75) Inventors: Do Young Ha, Seongnam-si (KR); Joon Oo Kim, Suwon-si (KR); Yun Je Oh, Yongin-si (KR); Joong Soo Ma, Seoul (KR); Myoung Hwan Seo, Daejeon (KR); Sung Chang Choi, Daejeon (KR); Myoung In Ji, Uijeongbu-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 597 days.

(21) Appl. No.: 12/361,606

(22) Filed: Jan. 29, 2009

(65) Prior Publication Data

US 2009/0209268 A1   Aug. 20, 2009

(30) Foreign Application Priority Data

Jan. 29, 2008   (KR) .............................. 2008-0009077

(51) Int. Cl.
*H04W 24/00* (2009.01)
*H04M 11/04* (2006.01)

(52) U.S. Cl. ............... 455/456.1; 455/456.2; 455/456.3; 455/567

(58) Field of Classification Search ............... 455/426.1, 455/426.2, 525, 524
See application file for complete search history.

(56) References Cited

U.S. PATENT DOCUMENTS

| | | | | |
|---|---|---|---|---|
| 7,158,484 | B1 * | 1/2007 | Ahmed et al. ................. | 370/254 |
| 7,567,822 | B2 * | 7/2009 | Hart et al. ................... | 455/562.1 |
| 7,835,333 | B2 * | 11/2010 | Park et al. ..................... | 370/338 |
| 7,880,676 | B2 * | 2/2011 | Ergen et al. ................... | 342/458 |
| 7,952,522 | B2 * | 5/2011 | Hohl ............................. | 342/463 |
| 8,005,486 | B2 * | 8/2011 | Pahlavan et al. ........... | 455/456.1 |
| 2004/0081166 | A1 * | 4/2004 | Stanforth et al. ........ | 370/395.32 |
| 2007/0159986 | A1 * | 7/2007 | Park et al. ..................... | 370/254 |

FOREIGN PATENT DOCUMENTS

KR   2006-0134271   12/2006

* cited by examiner

*Primary Examiner* — Tilahun B Gesesse
(74) *Attorney, Agent, or Firm* — Cha & Reiter, LLC

(57) ABSTRACT

A location sensing system and method for a mobile communication system is provided for maintaining location sensing service with the support of mobile nodes when there is an insufficient number of anchor nodes for reference points. A location sensing method for a mobile communication system includes discovering, at a source mobile node, anchor nodes in a vicinity; discovering, when a number of discovered anchor nodes is less than a predetermined number of reference nodes required for location sensing, neighboring mobile nodes; selecting at least one of neighboring mobile nodes as a reference mobile node; and computing a location of the source mobile node in cooperation with the predetermined number of reference nodes including the discovered anchor nodes and the reference mobile node.

18 Claims, 5 Drawing Sheets

LOCATION SENSING SYSTEM AND METHOD FOR MOBILE COMMUNICATION SYSTEM

CLAIM OF PRIORITY

This application claims priority under 35 U.S.C. §119 from an application entitled "LOCATION SENSING SYSTEM AND METHOD FOR MOBILE COMMUNICATION SYSTEM" filed in the Korean Intellectual Property Office on Jan. 29, 2008 and assigned Serial No. 2008-0009077, the contents of which are incorporated herein by reference in its entirety.

BACKGROUND OF THE INVENTION

1. Field of the Invention

The present invention relates to a mobile communication system. More particularly, the present invention relates to a location sensing system and method for a mobile communication system that is capable of providing location sensing service with the support of mobile nodes.

2. Description of the Related Art

Location sensing is one of the more important techniques in which recent mobile communication systems operate. Triangulation, scene analysis, and proximity are the three principal techniques for automatic location sensing.

Of the three techniques, triangulation location sensing technique computes the position of a mobile node by measuring its distance from three anchor nodes. In more detail, the mobile node measures the time-of-arrival to the three anchor nodes and determines the point at which three circles drawn with the radii calculated on the basis of the time-of-arrival as the location of the mobile node.

With regard to another of the three techniques, the scene analysis location sensing technique utilizes features of a scene sensed from a particular vantage point to draw conclusions about the location of an object in the scene. The scene analysis is categorized into a static scene analysis, which compares the observed image with reference images stored in a database, and a differential scene analysis, which tracks the difference between successive scenes to estimate location.

Finally, the third technique, a proximity location sensing technique, entails determining when the mobile node is "near" another node. There are three general approaches to sensing proximity: detecting physical contact with an object, monitoring wireless cellular access points which monitoring when a mobile device is in range of one or more access points in a cellular network, and observing automatic ID systems through the operation of various identification systems.

We refer now to FIG. 1, which is a schematic diagram illustrating a conventional triangular location sensing technique.

The triangular location sensing is known as the most accurate location sensing technique. Referring to the example in FIG. 1, a mobile node 100 communicates with three anchor nodes 110, 130, and 150.

In order to locate the mobile node 100 with the triangular location sensing technique, at least three anchor nodes have to be within the transmission range of the mobile node 100. Also, in view of the anchor nodes, the mobile node 100 should be within the transmission ranges of the respective anchor nodes 110, 130, and 150.

In other words, if the mobile node 100 is out of the range of any one of three anchor nodes 110, 130, and 150, it is impossible to locate the mobile node using the triangular location sensing technique. Also, in a case where at least one of three anchor nodes 110, 130, and 150 involved in an ongoing triangular location sensing is temporarily erroneous, the mobile node 100 fails computing its location.

Accordingly, there is a need for an improved triangular location sensing method that is capable of securing stability and reliability of location service even when the mobile node does not find three anchor nodes or an anchor node involved in the ongoing triangular location sensing process is erroneous.

SUMMARY OF THE INVENTION

The present invention provides a location sensing system and method for a mobile communication system that improves location information reliability.

Also, the present invention provides a location sensing system and method for a mobile communication system that provides stable location sensing service without support of an anchor node.

In addition, the present invention provides a location sensing system and method for a mobile communication system that provides location sensing service in cooperation with other mobile nodes without engagement of anchor node.

Also, the present invention provides a location sensing system and method for a mobile communication system that operates a location sensing process in cooperation with another mobile node which is calculating the location of the mobile node, especially when a number of reference anchor nodes are not enough.

Moreover, the present invention provides a location sensing system and method for a mobile communication system that improves location sensing accuracy, when performing the location sensing in cooperation with another mobile node, by selecting an optimal mobile node on the basis of sensing information (parameters).

Additionally, the present invention provides a location sensing system and method for a mobile communication system that selects an optimal mobile node on the basis of standard deviation of location sensing, Received Signal Strength Indication (RSSI) of an anchor node, and acceleration of mobile node.

In accordance with an exemplary embodiment of the present invention, a location sensing method for a mobile communication system includes discovering, at a source mobile node, anchor nodes in vicinity; discovering, when a number of discovered anchor nodes is less than a predetermined number of reference nodes required for location sensing, neighbor mobile nodes; selecting at least one of neighbor mobile nodes as a reference mobile node; and computing location of the source mobile node in cooperation with the predetermined number of reference nodes including the discovered anchor nodes and the reference mobile node.

In accordance with another exemplary embodiment of the present invention, a location sensing method for a mobile communication system includes broadcasting, when a source mobile node detects lack of number of anchor nodes, a device discovery request message; receiving one or more device discovery response messages transmitted by at least one neighbor mobile node positioned in a transmission range of the source mobile node; selecting one of the at least one neighbor mobile node as a reference mobile node on the basis of measurement information contained in the device discovery response messages; and computing a location of the source mobile node with support of the reference mobile node.

In accordance with yet another exemplary embodiment of the present invention, a location sensing method for a mobile communication system includes broadcasting, when a source mobile node detects lack of number of anchor nodes, a device discovery request message; transmitting, at neighbor mobile nodes received the device discovery request message, device discovery response message containing location information and measurement information to the source mobile node; analyzing, at the source mobile node, the location and measurement information contained in the received device discovery response messages; and selecting at least one of the neighbor mobile nodes as a reference mobile node on the basis of analysis result.

BRIEF DESCRIPTION OF THE DRAWINGS

The above features and advantages of the present invention will become more apparent from the following detailed description in conjunction with the accompanying drawings, in which.

DETAILED DESCRIPTION

Exemplary embodiments of the present invention are described herein below with reference to the accompanying drawings in detail. The same reference numbers are used throughout the drawings to refer to the same or like parts. Detailed description of well-known functions and structures incorporated herein may be omitted to avoid obscuring appreciation of the subject matter of the present invention by a person of ordinary skill in the art with such well-known functions and structures.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims.

The present invention proposes a location sensing system and method for locating a position of a mobile node in a mobile communication system. More particularly, the location sensing system and method enables the mobile node to proceed with an ongoing location sensing process with the support of another mobile node, even when the anchor node involved in the ongoing location sensing process has erroneous results.

That is, the location sensing system and method of the present invention allows a mobile node to locate its position in cooperation with other mobile nodes. Also, the present invention proposes an algorithm for selecting a reference mobile node representing the erroneous anchor node. The location sensing system and method of the present invention is applied to a mobile communication system comprising a plurality of mobile nodes and anchor nodes.

Figure 1:
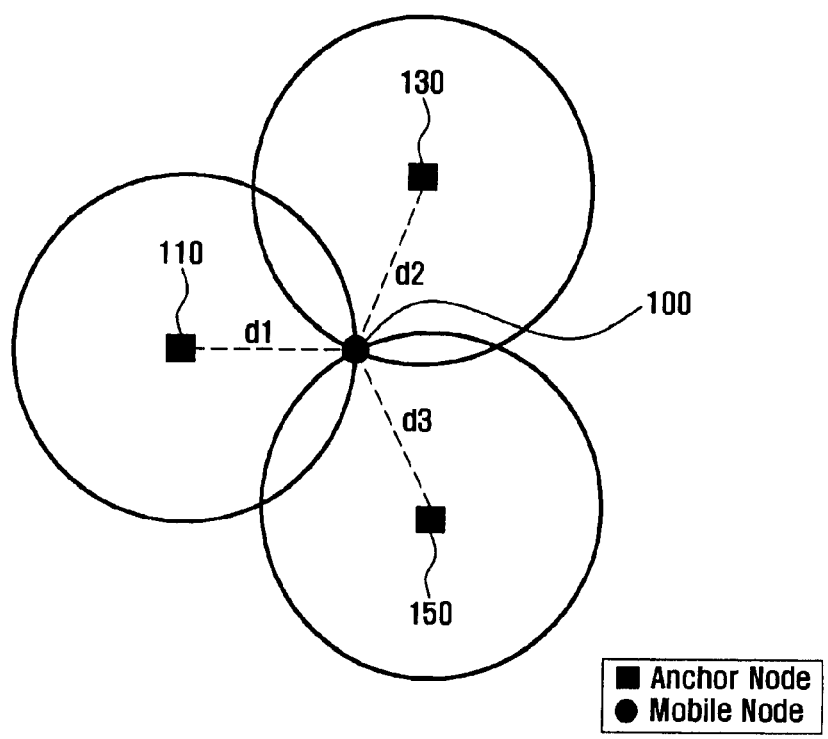
FIG. 1 is a schematic diagram illustrating a conventional triangular location sensing technique.
Figure 2:
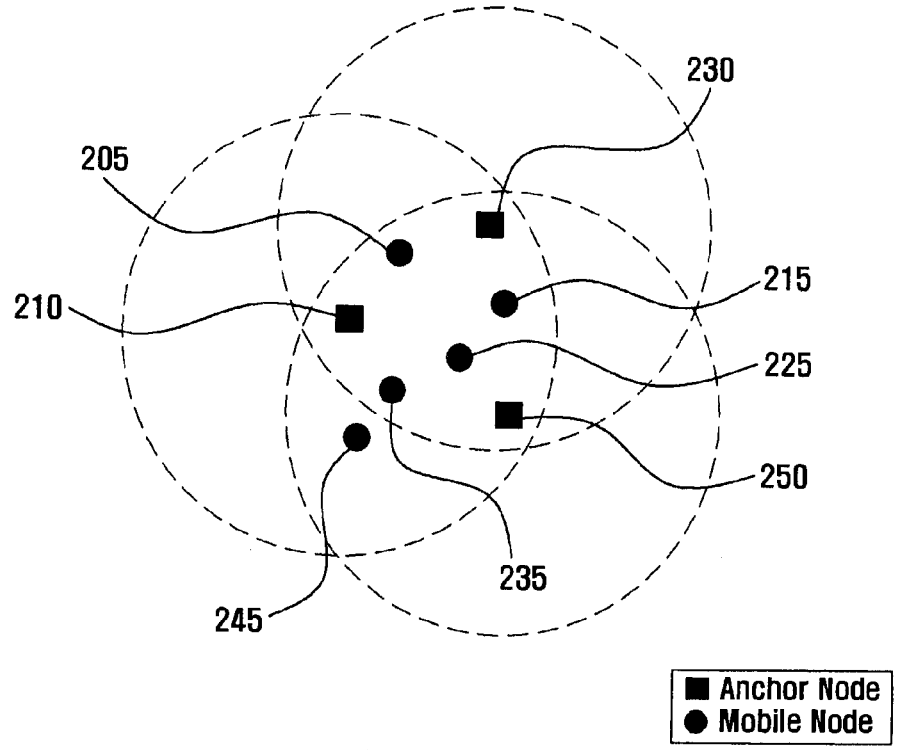
FIG. 2 is a schematic diagram illustrating a location sensing system according to an exemplary embodiment of the present invention.

FIG. 2 is a schematic diagram illustrating a location sensing system according to an exemplary embodiment of the present invention. In FIG. 2, four mobile nodes 205, 215, 225, and 235 are distributed in an available sensing range, and a mobile node 245 is out of the sensing area. Here, the sensing area is defined by the overlapping transmission ranges of three anchor nodes 210, 230, and 250.

Still referring to FIG. 2, each of the mobile nodes 205, 215, 225, and 235 positioned in the sensing area discovers the anchor nodes 210, 230, and 250, measures the distances from the respective anchor nodes 210, 230, and 250, and computes their respective location on the basis of the distances. The location is computed using the above-mentioned triangular location sensing technique.

With continued reference to FIG. 2, one of the mobile nodes 205, 215, 225, and 235 may move out of the sensing area, or at least one of the three anchor nodes 210, 230, and 250 happens to be in an erroneous state of operation, resulting in an absence of enough number of anchor nodes. In this particular case, the mobile node detects the unreachable or erroneous anchor node and removes the anchor node from an anchor list with which each mobile node manages the reachable anchor nodes. In this exemplary embodiment, the mobile node-supportive location sensing method is described with an example in that the mobile node 245 moves out of the sensing area.

The mobile node 245 moved out of the sensing area detects that the anchor node 230 is unreachable, and removes the anchor node 230 from its anchor list. Since at least three anchor nodes are required for the mobile node 245 to locate itself, the mobile node 245 searches for another anchor node.

If no other anchor node has been found, the mobile node 245 broadcasts a Device Discovery Request message such that the neighbor mobile nodes 205, 215, 225, and 235 receive the Device Discovery Request message. That is, the mobile node 245 can check the existence of the neighbor mobile nodes 205, 215, 225, and 235 by broadcasting the Device Discovery, Request message.

If the Device Discovery Request message has been received, each of the mobile nodes 205, 215, 225, and 235 transmits a Device Discovery Response message to the mobile node 245. The Device Discovery Response message contains information including position of the neighbor mobile node and the following parameters:

(1) Standard deviation of position measurements
(2) Standard deviation of RSSIs from the anchor node
(3) Average speed of the mobile node
(4) Acceleration sensed by acceleration sensor of the mobile node The parameters can be selectively contained in the Device Discovery Response message. In order to improve the location sensing accuracy, further parameters can be added.

After receiving the Device Discovery Response messages from the neighbor mobile nodes 205, 215, 225, and 235, the mobile node 245 selects the neighbor mobile node of which parameters have the least difference in values of the parameters (1)-(4), as an optimal reference mobile node. Since the neighbor mobile node of which standard deviation of positions measurements, average speed, and acceleration are smaller than those of other neighbor mobile nodes is considered as the node which moves least, it is possible to reduce the location computation error caused by movement. In this exemplary embodiment, the mobile node 215 is selected as the reference mobile node.

Once the reference mobile node is selected, the mobile node 245 can compute its location with the support of the two anchor node 210 and 250 and the reference mobile node 215. That is, the location sensing system according to this exemplary embodiment of the present invention enables providing the location sensing service even when the number of available anchor nodes is not enough.

The operation of the above-structured location sensing system is described hereinafter in more detail. However, the present invention is not limited to the following exemplary embodiments, but can be applied to various exemplary embodiments of triangular location sensing methods, for example.

Figure 3:
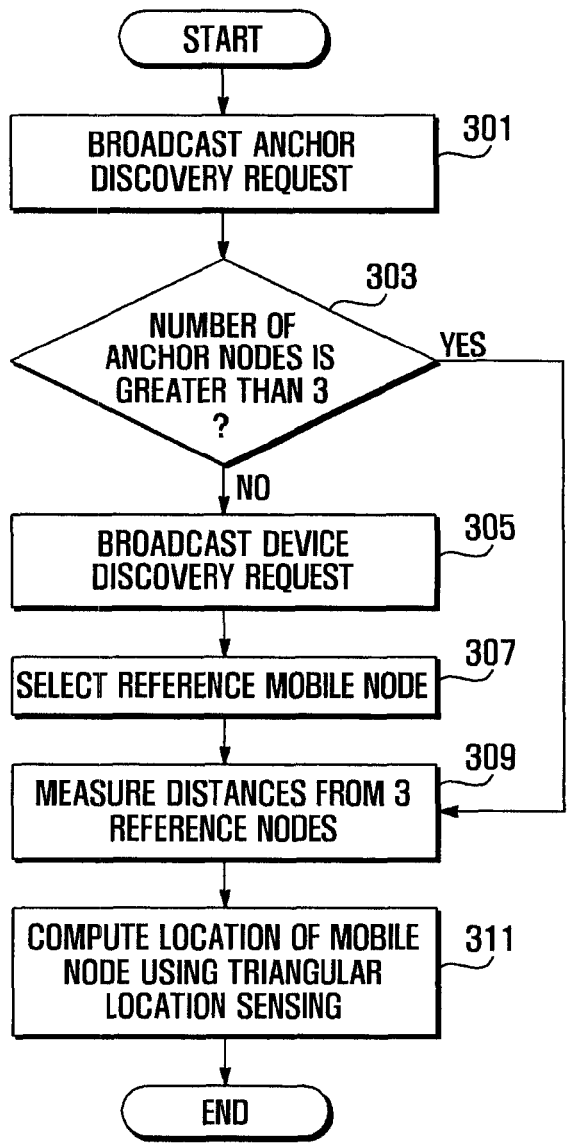
FIG. 3 is a flowchart illustrating a location sensing method according to an exemplary embodiment of the present invention.

FIG. 3 is a flowchart illustrating a location sensing method according to an exemplary embodiment of the present invention. The location sensing method according to this exemplary embodiment is accomplished on the basis of a triangular location sensing technique in consideration of a lack of anchor nodes.

Referring now to FIG. 3, a mobile node searches for anchor nodes around its vicinity (S301) by broadcasting an Anchor Discovery Request message. The mobile node recognizes the existence of the anchor nodes in its transmission range (neighbor anchor nodes) with by receiving Anchor Discovery Response messages transmitted to the mobile node in response to broadcast of the Anchor Discovery Request message.

After checking the existence of the neighbor anchor nodes, the mobile node determines whether a number of neighbor anchor nodes is equal to or greater than 3 (S303). This is because the triangular location sensing requires three reference points.

If the number of neighbor anchor nodes is equal to or greater than 3, the mobile node measures its distances from three reference nodes, i.e. the neighbor anchor nodes (S309), and computes its location on the basis of the distances (S311).

Referring back to (S303), if the number of neighbor anchor nodes is not equal to or greater than 3, at step (S305) the mobile node broadcasts a Device Discovery Request message to discover neighbor mobile nodes (S305). The mobile node can check the neighbor nodes on the basis of Device Discovery Response messages received in response to the Device Discovery Request message.

Next, the mobile node selects from the response to the Device Discovery Request Message at least one of the discovered neighbor mobile nodes to become a reference mobile node on the basis of parameters extracted from the Device Discovery Response messages (S307). The number of reference mobile nodes can be changed according to the number of neighbor anchor nodes discovered at step S303. For example, two reference mobile nodes are required when one anchor node is discovered, and three reference mobile nodes are required when no neighbor anchor node is discovered.

As described above, the mobile node can select the reference mobile node on the basis of at least one of the parameters contained in the Device Discovery Response messages.

Still referring to FIG. 3, the mobile node computes its location in cooperation with three reference nodes including the discovered anchor nodes and the reference mobile nodes. That is, the mobile node calculates the distances from the three reference nodes (S309) and computes its location using the calculated distances (S311).

Figure 4:
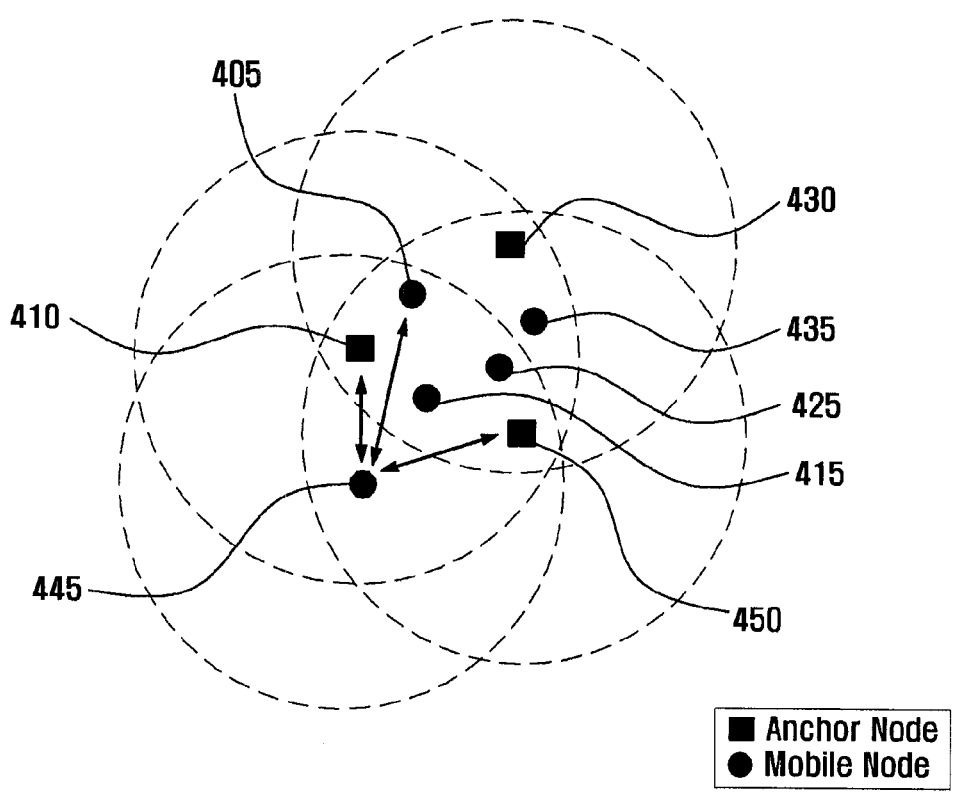
FIG. 4 is a diagram illustrating a triangular calculation process of the location sensing method of FIG. 3.

FIG. 4 is a diagram illustrating a triangular calculation process of the location sensing method of FIG. 3. In FIG. 4, a mobile node 445 moved out of a sensing area, which is defined by overlapping of the transmission ranges of three anchor node 410, 430, and 450, and the mobile node 445 calculates its location in cooperation with three reference nodes including two anchor nodes 410 and 450 and another mobile node 405. The mobile node 405 was typically selected in accordance with the Device Discovery Request as discussed above.

Referring to FIGS. 3 and 4, the mobile node 445 moved out of the sensing area broadcasts an Anchor Recovery Request message such that the two anchor nodes 410 and 450 located in the transmission range of the mobile node 445 can receive the Anchor Recovery Request message and transmit the Anchor Recovery Response messages to the mobile node 445. At this time, since the anchor node 430 is out of the transmission range of the mobile node 445, it cannot receive the Anchor Recovery Request message transmitted by the mobile node 445.

Since the two anchor nodes 410 and 450 are recovered, the mobile node 445 needs one more reference node for performing triangular calculation. In this case, the mobile node 445 broadcasts a Device Discovery Request message to discover another mobile node as a reference node. In response to the Device Discovery Request message, neighbor mobile nodes 405, 415, and 425 located in the transmission range of the mobile node 445 transmit Device Discovery Response messages to the mobile node 445 such that the mobile node 445 recognizes the existence of the neighbor mobile nodes 405, 415, and 425. Since the mobile node 435 is located outside of the transmission range of the mobile node 445, mobile node 435 does not receive the Device Discovery Request message from mobile node 445.

The mobile node 445 analyzes the Device Discovery Response messages transmitted by the neighbor mobile nodes 405, 415, and 425, and selects on the neighbor mobile nodes 405, 415, and 425 as the reference mobile node on the basis of the analysis result. In more detail, the mobile node 445 compares the values of at least one of parameters contained in the Device Discovery response messages and selects the neighbor mobile node of which parameter value is least as the reference mobile node. In FIG. 4, the neighbor mobile node 405 is selected as the reference mobile node.

After selecting the reference mobile node, the mobile node 445 then computes its location in cooperation with the three reference nodes, i.e. the two anchor nodes 410 and 450 and the reference mobile node 405 selected in the preceding paragraph. There can be additional advantages by simultaneous transmission in terms of the time for the entire operation being reduced.

In the above description, the anchor node discovery process and neighbor mobile node discovery process are performed separately. That is, the mobile node discovers the anchor nodes by broadcasting the Anchor Discovery Request message and discovers the neighbor mobile nodes by broadcasting the Device Discover Request message.

However, contrary to the above, it is also within the spirit and scope of the claimed invention that the anchor node discovery and mobile node discovery can be performed at the same time by broadcasting a combined device discovery request message. In this case, the mobile node computes, if at least three anchor nodes have been discovered, its location with the support of the three discovered anchor nodes. Otherwise, if less than three anchor nodes have been discovered, the mobile node selects at least one reference mobile node through the neighbor mobile node discovery process and computes its location with the support of the discovered anchor node and the at least one reference mobile node.

In the particular case of the use of the combined device discovery request message, a threshold of a specific parameter can be configured such that the mobile node receives the device discovery response messages of which parameter values are greater than the threshold. For example, the specific parameter may comprise, for example, the distance between the mobile node and the neighbor mobile node, and the threshold distance can be set to 3 m such that the neighbor mobile nodes in the range of 3 m responses to the device discovery request message transmitted by the mobile node. In this manner, it is possible to reduce contention for transmitting the device discovery response message between the neighbor mobile nodes and message processing load of the mobile node.

In another exemplary embodiment of the present invention, neighbor nodes (including anchor nodes and mobile nodes) overhear the device discovery messages to acquire the information about its neighbor nodes. In this case, a specific mobile node requests distance measurement using a first packet. At this time, the mobile node sends the standard deviation of its location measured until then together with the distance measurement request message, and other neighbor nodes overhear the distance measurement request message to acquire use the information from the distance measurement request message. That is, when a specific mobile node is required to send a device discovery request message, the mobile node generates the device discovery message with reference to the information acquired by overhearing the device discovery messages exchanged between other mobile nodes.

Figure 5:
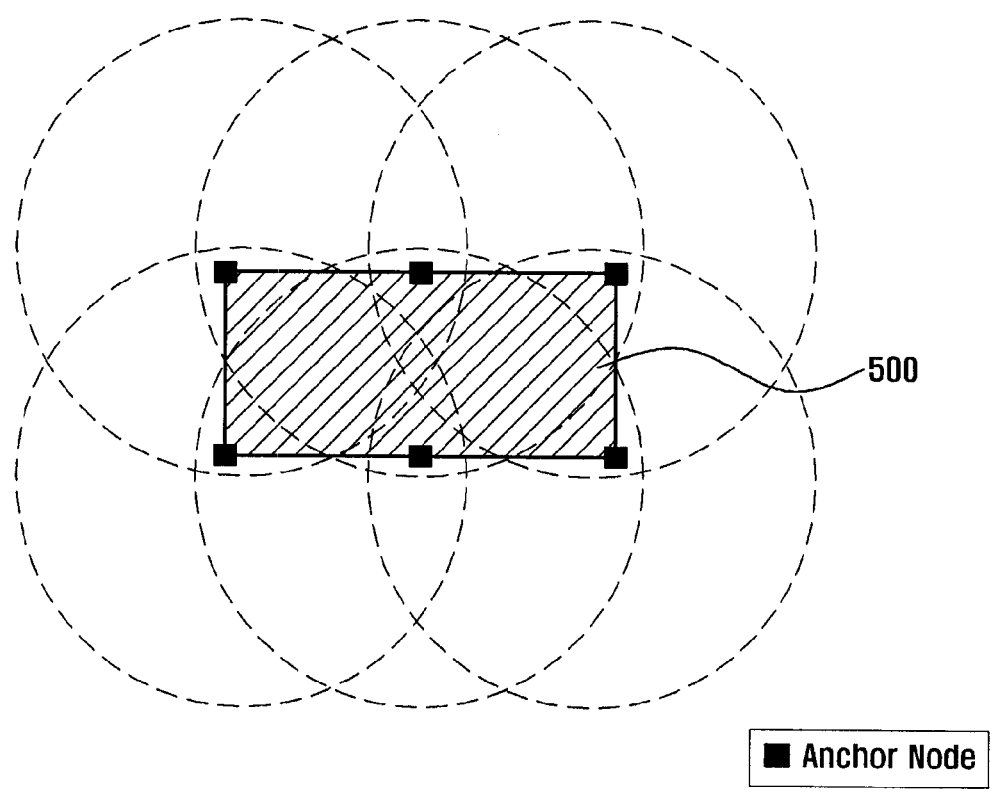
FIG. 5 is a diagram illustrating an expansion of sensing area in a location sensing method according to an exemplary embodiment of the present invention.

FIG. 5 is a diagram illustrating an expansion of sensing area in a location sensing method according to an exemplary embodiment of the present invention. In FIG. 5, the sensing area is defined, for this example, by the transmission ranges of 6 anchor nodes.

Referring to FIG. 5, if location sensing is available in the sensing area 500 depicted as a rectangular region and the transmission range of each anchor node is 50 m, the size of the rectangular region is 3872 m² (88 m×44 m), and sensing area including the area surrounding the rectangular region becomes 5401 m².

In such an exemplary environment, adding 1 mobile node to the sensing area increases the available sensing area to 8118 m² in average, which is 1.5 times larger than before adding the mobile node. In a case of adding 2 mobile nodes to the sensing area, the available sensing area increases to 10388 m² in average, which is 1.9 times larger than before adding the mobile nodes.

As described above, the location sensing system and method of the present invention expands the sensing area by temporarily using the mobile node as a reference point for triangular location sensing when there are less than three anchor nodes within range. The location sensing method of the present invention can be used for expanding the location sensing service area by installing a mobile node having no mobility in an area requiring a location sensing service with the least number of anchor nodes.

Also, the location sensing system and method of the present invention enables a mobile node to compute its location through the triangular location sensing technique with three reference points, including at least one mobile node providing one of the reference points even when the anchor nodes are erroneous, resulting in improvement of location sensing reliability.

As described above, the location sensing system and method for a mobile communication system according to the present invention expands available sensing area in which a mobile node can compute its location by using neighbor mobile nodes, as reference points for triangular location sensing technique, as well as fixed anchor nodes. The present invention can be implemented with the fewest number of anchor nodes and still provide support of mobile nodes installed in shadow areas, resulting in reduction of system implementation and maintenance costs. The present invention allows mobile nodes to act as reference points for triangular location sensing especially when at least one anchor node has erroneous operations, resulting in improvement of location sensing service reliability.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A location sensing method for a mobile communication system, comprising the steps of:
    (a) discovering, by a source mobile node, anchor nodes within a predefined vicinity;
    (b) discovering neighbor mobile nodes, when a number of discovered anchor nodes is fewer than a predetermined number of reference nodes required for location sensing, discovering neighbor mobile nodes includes:
        (i) broadcasting a device discovery request message to the neighbor mobile nodes; and
        (ii) receiving device discovery response messages from the neighbor mobile nodes in response to the device discovery request message;
    (c) selecting at least one neighbor mobile node as a reference mobile node in conjunction with the discovered anchor nodes, the reference mobile node selected with reference to measurement information contained in the device discovery response messages in step (ii);
    (d) computing a location of the source mobile node in cooperation with the predetermined number of reference nodes including the discovered anchor nodes and the reference mobile node;
    wherein the measurement information comprise at least one of a standard deviation of measurements, a standard deviation of Received Signal Strength Indications (RSSIs) of anchor nodes, an average speed of the neighbor mobile node, and an acceleration of the source mobile node.

2. The location sensing method of claim 1, wherein the reference mobile node comprises the neighbor mobile node of which a predetermined parameter is less than a same predetermined parameter of other neighbor mobile nodes.

3. The location sensing method of claim 1, further comprising:
    overhearing, at the source mobile node, messages exchanged between the neighbor mobile nodes and the anchor nodes; and
    generating the device discovery request message with reference to measurement information extracted from the overheard messages.

4. The location sensing method of claim 1, wherein the device discovery request message contains a threshold value of a specific parameter for limiting the neighbor mobile nodes to transmit the device discovery response message.

5. The method according to claim 4, where the threshold value of the specific parameter is set such that the neighbor mobile nodes within the range of the threshold value responds to the device discovery request.

6. The location sensing method of claim 1, further comprising removing the anchor nodes that are identified in an anchor list but not discovered.

7. The method according to claim 1, wherein the predetermined vicinity comprises a radio range of the anchor nodes.

8. A location sensing system for a mobile communication system, comprising:
   means for broadcasting a device discovery request message, when a source mobile node detects a lack of predetermined number of anchor nodes;
   means for receiving device discovery response messages transmitted by at least one neighbor mobile node positioned in a transmission range of the source mobile node;
   means for selecting one of the at least one neighbor mobile node as a reference mobile node on the basis of measurement information contained in the device discovery response messages; and
   means for computing a location of the source mobile node with support of the reference mobile node;
   wherein the measurement information comprises at least one of a standard deviation of measurements, a standard deviation of Received Signal Strength Indications (RSSIs) of anchor nodes, an average speed of neighbor mobile node, and an acceleration of neighbor mobile node.

9. The location sensing system of claim 8, wherein the reference mobile node comprises the neighbor mobile node of which a parameter of the measurement information has a value less than those of other neighbor mobile nodes.

10. The location sensing system of claim 9, wherein the broadcasting a device discovery message comprises:
    means for overhearing, at the source mobile node, messages exchanged between the neighbor mobile nodes and anchor nodes;
    means for extracting distance parameters from the messages; and
    means for generating the device discovery request message to be selectively delivered to the neighbor mobile nodes with reference to the distance parameters.

11. The location sensing system of claim 8, wherein broadcasting a device discovery message comprises:
    means for generating the device discovery request message with a threshold of a parameter; and
    means for transmitting the device discovery response message from the neighbor mobile nodes that satisfy a condition associated with the threshold to the source mobile node.

12. The location sensing system of claim 8, further comprising means for removing anchor nodes, identified in an anchor list but not erroneous, from the anchor list.

13. A location sensing method for a mobile communication system, comprising:
    (a) broadcasting by a source mobile node, a device discovery request message, when a source mobile node detects less than a predetermined number of anchor nodes;
    (b) receiving by the source mobile node, a device discovery response message containing location information and measurement information to the source mobile node by neighbor mobile nodes which received the device discovery request message broadcast in (a);
    (c) analyzing, at the source mobile node, the location and measurement information contained in the received device discovery response messages; and
    (d) selecting at least one of the neighbor mobile nodes as a reference mobile node wherein the measurement information comprises at least one of a standard deviation of measurements, a standard deviation of Received Signal Strength Indications (RSSIs) of anchor nodes, an average speed of neighbor mobile node, and an acceleration of neighbor mobile node on the basis of analysis result.

14. The location sensing method of claim 13 wherein broadcasting a device discovery request message in step (a) includes:
    (i) overhearing, at the source mobile node, messages exchanged between the neighbor mobile nodes and anchor nodes;
    (ii) extracting distance measurement parameters from the messages; and
    (iii) generating the device discovery request message to be selectively delivered to the neighbor mobile nodes with reference to the distance measurement parameters.

15. The location sensing method of claim 13, wherein broadcasting a device discovery message includes generating the device discovery request message with a threshold of a parameter.

16. The location sensing method of claim 15, further comprising receiving by the source mobile node the device discovery response message from the neighbor mobile nodes in step (b) that satisfy a condition associated with the threshold to the source mobile node.

17. The location sensing method of claim 13, wherein selecting a reference mobile node comprises:
    comparing mobility levels of the neighbor mobile nodes, the mobility levels being determined on the basis of the measurement information; and
    selecting as the reference mobile node at least one neighbor mobile node of which mobility level is less than those of other neighbor mobile nodes.

18. The location sensing method of claim 17, wherein a number of the at least one neighbor mobile node to be selected as reference mobile node in step (a) is determined according to the number of discovered anchor nodes.

* * * * *